United States Patent
Shimizu et al.

(10) Patent No.: US 8,636,483 B2
(45) Date of Patent: Jan. 28, 2014

(54) PUMP APPARATUS, POWER TRANSMISSION APPARATUS, AND VEHICLE

(75) Inventors: Tetsuya Shimizu, Anjo (JP); Kazuhiko Kato, Kariya (JP); Kazunori Ishikawa, Toyota (JP); Noriomi Fujii, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 434 days.

(21) Appl. No.: 12/958,531

(22) Filed: Dec. 2, 2010

(65) Prior Publication Data

US 2011/0142690 A1    Jun. 16, 2011

(30) Foreign Application Priority Data

Dec. 15, 2009    (JP) .................................. 2009-284178

(51) Int. Cl.
| | |
|---|---|
| F04B 19/00 | (2006.01) |
| F04B 37/00 | (2006.01) |
| F04B 49/00 | (2006.01) |
| F04B 23/12 | (2006.01) |

(52) U.S. Cl.
USPC ............................ 417/426; 417/286; 417/206

(58) Field of Classification Search
USPC ............... 417/2, 205, 206, 286, 426
See application file for complete search history.

(56) References Cited

U.S. PATENT DOCUMENTS

| | | | | |
|---|---|---|---|---|
| 2,709,339 | A | * | 5/1955 | Edelman et al. ............... 417/205 |
| 7,282,005 | B2 | * | 10/2007 | Shimizu et al. ............... 475/127 |
| 2005/0202917 | A1 | * | 9/2005 | Shimizu et al. ............... 475/120 |
| 2008/0308757 | A1 | * | 12/2008 | Nakai et al. ............... 251/129.15 |
| 2009/0139800 | A1 | | 6/2009 | Rhein et al. |
| 2009/0256094 | A1 | * | 10/2009 | Sasago ...................... 251/129.15 |
| 2009/0301588 | A1 | * | 12/2009 | Shimizu et al. .......... 137/625.64 |

FOREIGN PATENT DOCUMENTS

| | | |
|---|---|---|
| DE | 10 2008 058 879 A1 | 6/2009 |
| JP | A-2007-126974 | 5/2007 |
| JP | A-2008-025710 | 2/2008 |
| JP | A-2008-180303 | 8/2008 |
| WO | WO 2008/155929 A1 | 12/2008 |
| WO | WO2009/145176 | 12/2009 |
| WO | WO 2009/145716 A1 | 12/2009 |

OTHER PUBLICATIONS

U.S. Appl. No. 12/662,715, filed Apr. 29, 2010 in the name of Tetsuya Shimizu et al.
Feb. 15, 2011 International Search Report issued in PCT/JP2010/070226 (with translation).
Translation of Aug. 28, 2013 Office Action issued in German Patent Application No. 11 2010 003 555.5.

* cited by examiner

*Primary Examiner* — Charles Freay
*Assistant Examiner* — Alexander Comley
(74) *Attorney, Agent, or Firm* — Oliff & Berridge, PLC

(57) ABSTRACT

A pump apparatus configured with a first pump for pumping working fluid in accordance with a reciprocation of a piston using a space between a first open/close valve for suction and a second open/close valve for discharge as a pump chamber. The pump apparatus is also configured a first flow passage for supplying the working fluid from a supply source to an operation subject via the first open/close valve, the pump chamber, and the second open/close valve in accordance with an operation of the first pump. A second flow passage supplies the working fluid pumped by a second pump, which is different from the first pump, to the pump chamber. A selector is configured to select either the first flow passage or the second flow passage.

13 Claims, 12 Drawing Sheets

|   |     | C1 | C2 | C3 | B1 | B2  | F1 |
|---|-----|----|----|----|----|-----|----|
|   | R   |    |    | O  |    | O   |    |
| D | 1st | O  |    |    |    | (O) | O  |
|   | 2nd | O  |    |    | O  |     |    |
|   | 3rd | O  | O  |    |    |     |    |
|   | 4th |    | O  |    | O  |     |    |

(O) INDICATES ENGINE BRAKING

F I G . 6
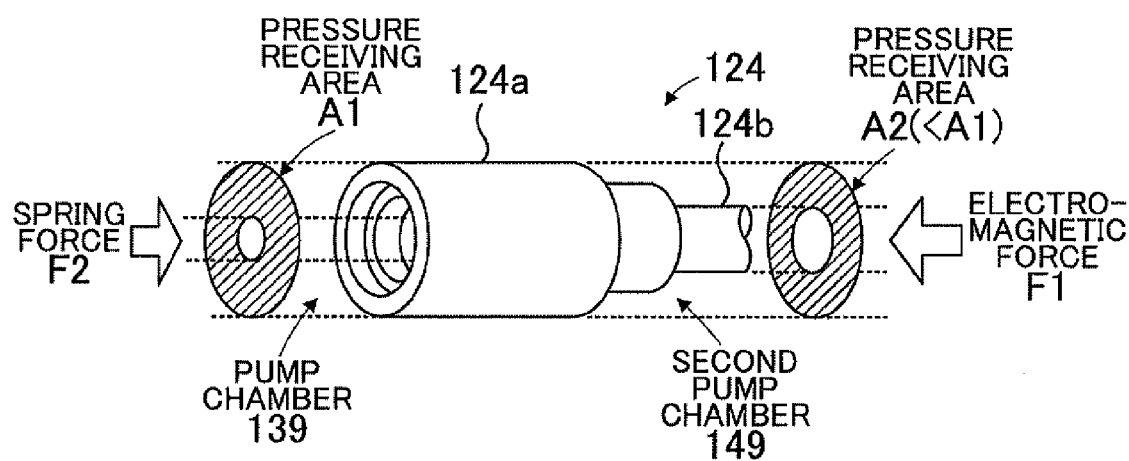

PUMP APPARATUS, POWER TRANSMISSION APPARATUS, AND VEHICLE

INCORPORATION BY REFERENCE

The disclosure of Japanese Patent Application No. 2009-284178 filed on Dec. 15, 2009 including the specification, drawings and abstract is incorporated herein by reference in its entirety.

BACKGROUND OF THE INVENTION

The present invention relates to a pump apparatus that has a pump chamber and includes a first pump that pumps a working fluid in accordance with a reciprocating motion of a piston, a power transmission apparatus that includes the pump apparatus and transmits power from a motor via a frictional engagement element, and a vehicle installed with the power transmission apparatus.

DESCRIPTION OF THE RELATED ART

An apparatus including a hydraulic pump (a mechanical pump) driven by power from an engine, a manual shift valve operated in conjunction with a shift operation, a solenoid valve having an input port that is connected to the hydraulic pump via the manual shift valve, a selector valve that is disposed in an oil passage connecting an output port of the solenoid valve and a frictional engagement device (a clutch) to function as a two-position solenoid valve that selects a first position for connecting the oil passage and a second position for blocking the oil passage, and an electromagnetic pump that supplies a discharge pressure directly to the clutch has been proposed in the related art as this type of power transmission apparatus (see Japanese Patent Application Publication No. JP-A-2008-180303, for example).

SUMMARY OF THE INVENTION

When an electromagnetic pump is supplementarily used alongside a mechanical pump, the electromagnetic pump is driven and stopped intermittently, and therefore an air pocket may be generated in a pump chamber when the electromagnetic pump is stopped. In this case, it takes time to generate oil pressure when the electromagnetic pump is next started, and therefore oil pressure cannot be supplied to the clutch quickly.

It is a main object of a pump apparatus, a power transmission apparatus and a vehicle according to the present invention to improve the starting performance of a pump in a pump apparatus having a pump chamber and including a pump that pumps a working fluid in accordance with a reciprocating motion of a piston.

To achieve the main object described above, the pump apparatus, power transmission apparatus and vehicle according to the present invention employ the following means.

A pump apparatus according to a first aspect of the present invention includes: a first pump for pumping working fluid in accordance with a reciprocation of a piston using a space between a first open/close valve for suction and a second open/close valve for discharge as a pump chamber; a first flow passage for supplying the working fluid from a supply source to an operation subject via the first open/close valve, the pump chamber, and the second open/close valve in accordance with an operation of the first pump; a second flow passage for supplying the working fluid pumped by a second pump, which is different from the first pump, to the pump chamber; and a selector for selecting either the first flow passage or the second flow passage.

In the pump apparatus according to the first aspect of the present invention, the first flow passage for supplying the working fluid from the supply source to the operation subject via the first open/close valve, the pump chamber, and the second open/close valve in accordance with an operation of the first pump, and the second flow passage for supplying the working fluid pumped by the second pump, which is different from the first pump, to the pump chamber are provided, and the selector selects either the first flow passage or the second flow passage. Hence, an air pocket formed in the pump chamber can be discharged by the working fluid pumped by the second pump, and therefore deterioration of a starting performance caused by the air pocket can be prevented. In other words, the starting performance of the pump can be improved.

In the pump apparatus according to a second aspect of the present invention, the selector may be set to select the first flow passage when the first pump is operative and select the second flow passage when the first pump is stopped.

Further, in the pump apparatus according to a third aspect of the present invention, the second flow passage may be a flow passage for supplying the working fluid pumped by the second pump to the pump chamber via the first open/close valve. Thus, a part of the second flow passage is shared by the first flow passage, and therefore a fluid pressure circuit can be made more compact. According to a fourth aspect of the present invention, the second flow passage may be a circulation flow passage for draining the working fluid pumped by the second pump via the first open/close valve, the pump chamber, and the second open/close valve.

Furthermore, in the pump apparatus according to a fifth aspect of the present invention, the first pump may be controlled to operate when the second pump is stopped and to stop when the second pump is operative, and the selector may be a switch valve that is operated by fluid pressure from the second pump to open the first flow passage and block the second flow passage when fluid pressure is not applied thereto by the second pump and to block the first flow passage and open the second flow passage when fluid pressure is applied thereto by the second pump. Here, the "switch valve" includes a constitution in which opening and closing of the first flow passage and second flow passage are performed by a single valve and a constitution in which a valve for opening and closing the first flow passage and a valve for opening and closing the second flow passage are provided separately.

A power transmission apparatus according to a sixth aspect of the present invention is a power transmission apparatus that includes the pump apparatus according to the present invention described above, and transmits power from a motor via a frictional engagement element serving as the operation subject, including a third flow passage for supplying working fluid pumped by the second pump to a fluid pressure servo of the frictional engagement element, wherein the first pump is a pump for pumping the working fluid upon reception of a power supply, the second pump is a pump for pumping the working fluid in accordance with power from the motor, and the switch valve is also a valve that opens the third flow passage when fluid pressure is applied thereto by the second pump and blocks the third flow passage when fluid pressure is not applied thereto by the second pump.

The power transmission apparatus according to the sixth aspect of the present invention includes the pump apparatus according to the present invention described above, and therefore the starting performance of the first pump can be improved. As a result, the working fluid can be supplied from the first pump to the fluid pressure servo of the frictional engagement element quickly. Further, the third flow passage for supplying the working fluid pumped by the second pump to the fluid pressure servo can be opened and closed by the switch valve in accordance with the fluid pressure from the second pump.

In the power transmission apparatus according to a seventh aspect of the present invention, the first pump may be a solenoid valve including an electromagnetic unit for generating an electromagnetic force, which functions as an electromagnetic pump for pumping the working fluid when the piston is caused to reciprocate by the electromagnetic force of the electromagnetic unit, and also functions as a pressure regulating valve that has a pressure regulating chamber separate from the pump chamber and uses the electromagnetic force of the electromagnetic unit to regulate fluid pressure from the first pump and then output the regulated fluid pressure. Thus, the apparatus can be made more compact. In the power transmission apparatus according to an eighth aspect of the present invention, the first pump may include: a piston defining a first fluid chamber used as the pump chamber and a second fluid chamber connected to the operation subject; an electromagnetic unit that uses the electromagnetic force to cause the piston to perform an outward motion; an elastic member that causes the piston to perform a return motion by applying an elastic force to the piston in an opposite direction to the electromagnetic force of the electromagnetic unit; the first open/close valve, which is attached in a direction for permitting the working fluid to move into the first fluid chamber; and the second open/close valve, which is provided in a flow passage connecting the first fluid chamber and the second fluid chamber and attached in a direction for permitting the working fluid to move from the first fluid chamber to the second fluid chamber, and the piston may define the first fluid chamber and the second fluid chamber such that during the outward motion, a volume of the first fluid chamber is reduced and a volume of the second fluid chamber is increased and during the return motion, the volume of the first fluid chamber is increased and the volume of the second fluid chamber is reduced. The piston is formed such that a change of the volume of the first fluid chamber becomes greater than a change of the volume of the second fluid chamber when the piston reciprocates. Thus, a compression efficiency of the pump can be increased, and as a result, the performance of the first pump can be improved. According to a ninth aspect of the present invention, the second flow passage may be formed such that working fluid circulates from the second pump via the first open/close valve, the first fluid chamber, the second open/close valve, and the second fluid chamber in sequence.

In the power transmission apparatus according to a tenth or an eleventh aspect of the present invention, in which the first pump functions as both a pressure regulating valve and an electromagnetic pump, the first open/close valve and the second open/close valve may be built into the solenoid valve, and the first open/close valve and the second open/close valve may be built into the switch valve. According to the tenth aspect, the volume of the pump chamber can be reduced, thereby suppressing intermixing of air. According to the eleventh aspect, as a twelfth aspect of the present invention, a space in the switch valve surrounded by the first open/close valve and the second open/close valve may be connected to the solenoid valve and used as a part of the pump chamber. The switch valve may include: a hollow portion having a signal pressure input port for inputting fluid pressure from the second pump as a signal pressure, a suction port for inputting the working fluid into an inflow side of the first open/close valve, a discharge port for outputting the working fluid from an outflow side of the second open/close valve to the fluid pressure servo of the frictional engagement element, a discharge port for discharging the working fluid from the outflow side of the second open/close valve, a first input port connected to the supply source of the working fluid, a second input port for inputting the working fluid pumped by the second pump, a first output port connected to the suction port via a flow passage outside the switch valve, a third input port connected to a pressure regulating chamber of the solenoid valve, and a second output port connected to the fluid pressure servo of the frictional engagement element; a spool that slides within the hollow portion; and the first open/close valve and the second open/close valve, which are disposed in the hollow portion. The spool may operate such that when fluid pressure is input into the signal pressure input port, the working fluid pumped by the second pump circulates through the second input port, the first output port, the suction port and the discharge port in sequence while the working fluid from the pressure regulating chamber of the solenoid valve is supplied to the fluid pressure servo via the third input port and the second output port, and when fluid pressure is not input into the signal pressure input port, the working fluid from the supply source is supplied to the fluid pressure servo via the first input port, the first output port, the suction port, the first pump and the discharge port in sequence while the third input port and the second output port are blocked.

A vehicle according to a thirteenth aspect of the present invention includes the power transmission apparatus according to any of the aspects of the present invention described above, or in other words basically includes a power transmission apparatus which includes: a first pump for pumping working fluid in accordance with a reciprocation of a piston using a space between a first open/close valve for suction and a second open/close valve for discharge as a pump chamber; a first flow passage for supplying the working fluid from a supply source to an operation subject via the first open/close valve, the pump chamber, and the second open/close valve in accordance with an operation of the first pump; a second flow passage for supplying the working fluid pumped by a second pump, which is different from the first pump, to the pump chamber; and a selector for selecting either the first flow passage or the second flow passage.

The vehicle according to the thirteenth aspect of the present invention is installed with the power transmission apparatus according to the present invention and is therefore capable of exhibiting similar effects to the effects exhibited by the power transmission apparatus.

BRIEF DESCRIPTION OF THE DRAWINGS

FIG. 6 is an illustrative view illustrating a pressure receiving area of a front surface of a spool 124 in a pump chamber 139 and a pressure receiving area of a back surface of the spool 124 in a second pump chamber 149;

DETAILED DESCRIPTION OF THE EMBODIMENT

An embodiment of the present invention will be described below.

Figure 1:
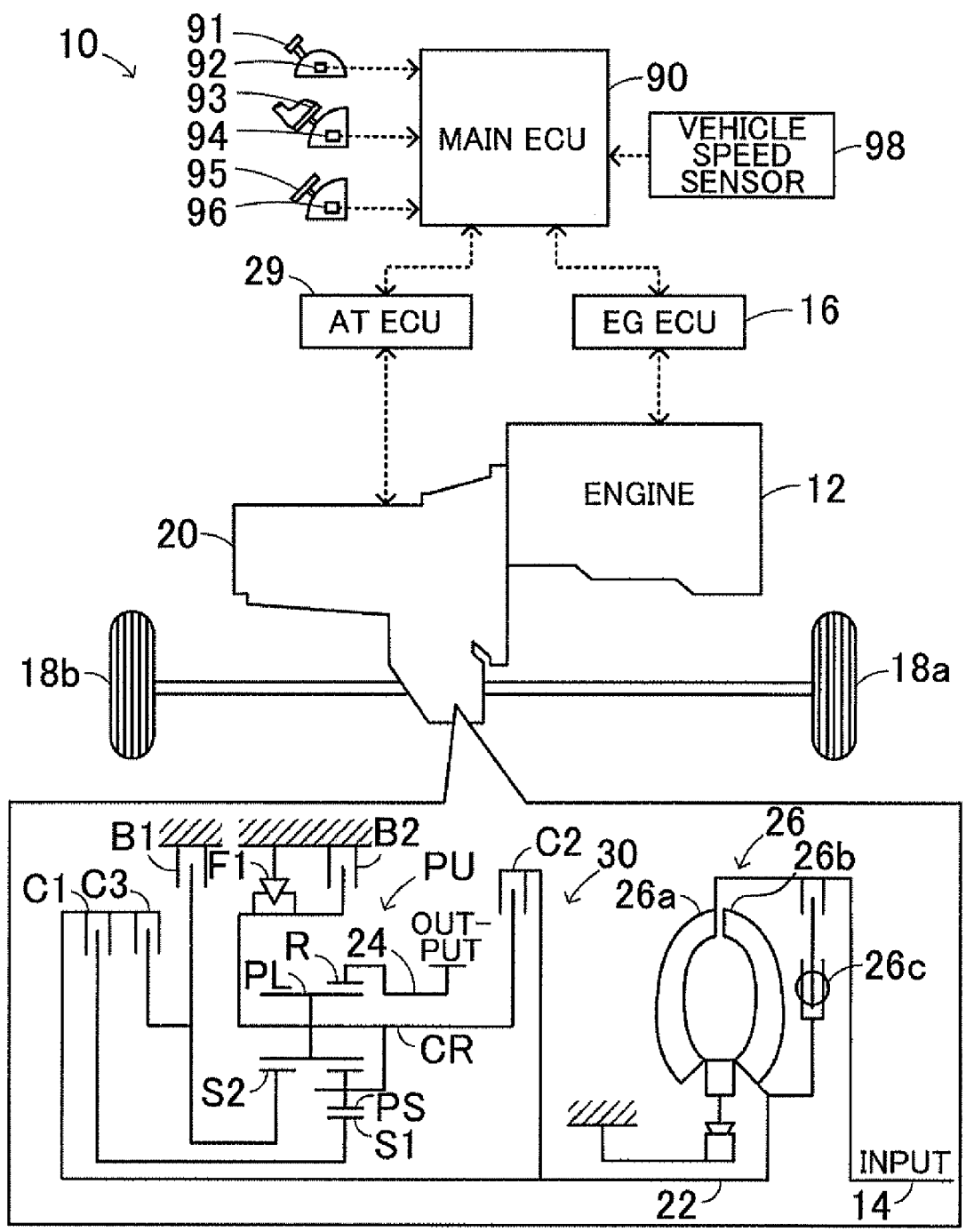
FIG. 1 is a schematic diagram showing the constitution of a vehicle 10 installed with a power transmission apparatus 20 serving as an embodiment of the present invention.
Figures 2, 3:
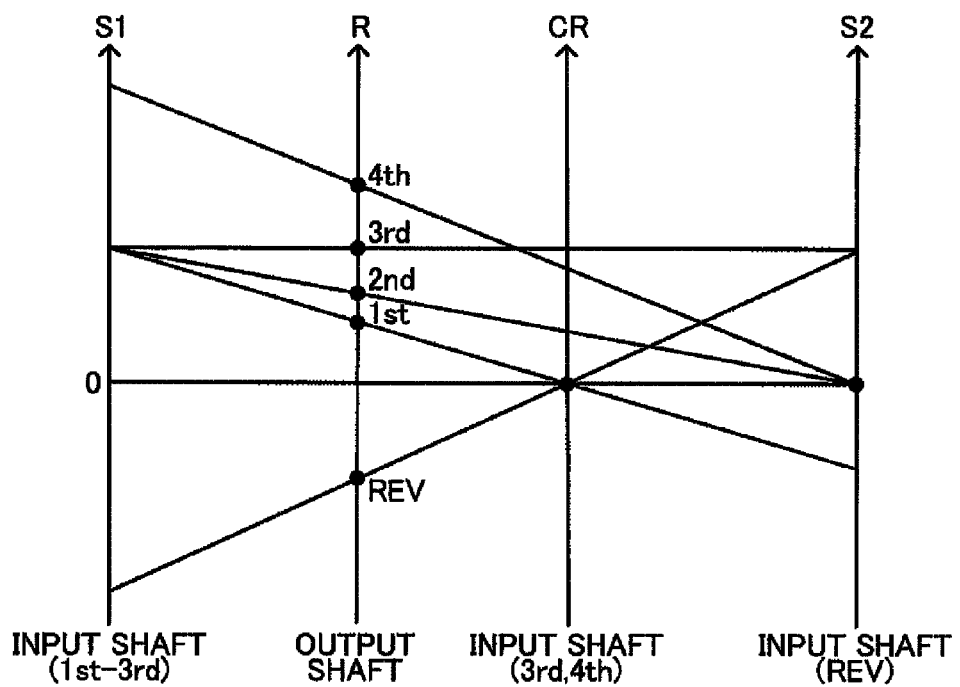
FIG. 2 is an operation table of an automatic speed change mechanism 30.
FIG. 3 is a collinear diagram showing rotation speed relationships among respective rotary elements of the automatic speed change mechanism 30.

FIG. 1 is a schematic diagram showing the constitution of a vehicle 10 installed with a power transmission apparatus 20 serving as an embodiment of the present invention, and FIG. 2 is an operation table of an automatic speed change mechanism 30.

As shown in the drawing, the power transmission apparatus 20 according to this embodiment is installed in an FF (front-engine, front-wheel-drive) type vehicle 10, for example, and includes a torque converter 26 having a lockup clutch for transmitting power from an engine 12 operated under the control of an engine electronic control unit (EG ECU) 16 while performing torque amplification, an automatic speed change mechanism 30 that changes speed of power from the torque converter 26 and transmits the power to vehicle wheels 18a, 18b at the changed speed, and an AT ECU 29 that controls the entire apparatus. The vehicle 10 according to this embodiment includes a main ECU 90 that controls the entire vehicle, including the engine 12 and the power transmission apparatus 20, by exchanging control signals and data relating to the operating states of the engine 12 and the power transmission apparatus 20 with the EG ECU 16 and the AT ECU 29 through communication. A shift position SP from a shift position sensor 92 for detecting an operating position of a shift lever 91, an accelerator pedal position Acc from an accelerator pedal position sensor 94 for detecting a depression amount of an accelerator pedal 93, a brake switch signal BSW from a brake switch 96 for detecting depression of a brake pedal 95, a vehicle speed V from a vehicle speed sensor 98, and so on are input into the main ECU 90.

The torque converter 26 includes a pump impeller 26a connected to a crankshaft 14 of the engine 12, and a turbine runner 26b connected to an input shaft 22 of the automatic speed change mechanism 30 and disposed opposite the pump impeller 26a. The torque converter 26 performs torque transmission by the pump impeller 26a converting an engine torque into a flow of working oil and the turbine runner 26b converting this flow of working oil into a torque acting on the input shaft 22. Further, the torque converter 26 has an inbuilt lockup clutch 26c, and by engaging the lockup clutch 26c, the crankshaft 14 of the engine and the input shaft 22 of the automatic speed change mechanism 30 are directly connected such that engine torque is transmitted directly.

The automatic speed change mechanism 30 includes a planetary gear unit PU, three clutches C1, C2, C3, two brakes B1, B2, and a one-way clutch F1. The planetary gear unit PU is constituted by a Ravigneaux planetary gear mechanism having two sun gears S1, S2 serving as external gears, a ring gear R serving as an internal gear, a plurality of short pinion gears PS meshed with the sun gear S1, a plurality of long pinion gears PL meshed with the sun gear S2 and the plurality of short pinion gears PS and also meshed with the ring gear R, and a carrier CR that connects the plurality of short pinion gears PS and the plurality of long pinion gears PL and carries the plurality of short pinion gears PS and the plurality of long pinion gears PL to be rotatable and revolvable, wherein the sun gear S1 is connected to the input shaft 22 via the clutch C1, the sun gear S2 is connected to the input shaft 22 via the clutch C3 and is permitted to rotate and prohibited from rotating by the brake B1, the ring gear R is connected to an output shaft 24, and the carrier CR is connected to the input shaft 22 via the clutch C2. Further, the carrier CR is restricted to rotate in one direction by the one-way clutch F1 and permitted to rotate and prohibited from rotating by the brake B2, which is provided in parallel with the one-way clutch F1. Note that power output to the output shaft 24 is transmitted to the vehicle wheels 18a, 18b via a counter gear and a differential gear, which are not shown in the drawings.

Further, as shown by the operation table in FIG. 2, the automatic speed change mechanism 30 is capable of switching between first to fourth forward speeds and reverse through ON/OFF combinations of the clutches C1 to C3 and brakes B1, B2. Note that FIG. 3 is a collinear diagram showing rotation speed relationships among the sun gears S1, S2, the ring gear R and the carrier CR at each shift speed of the automatic speed change mechanism 30.

Figure 4:
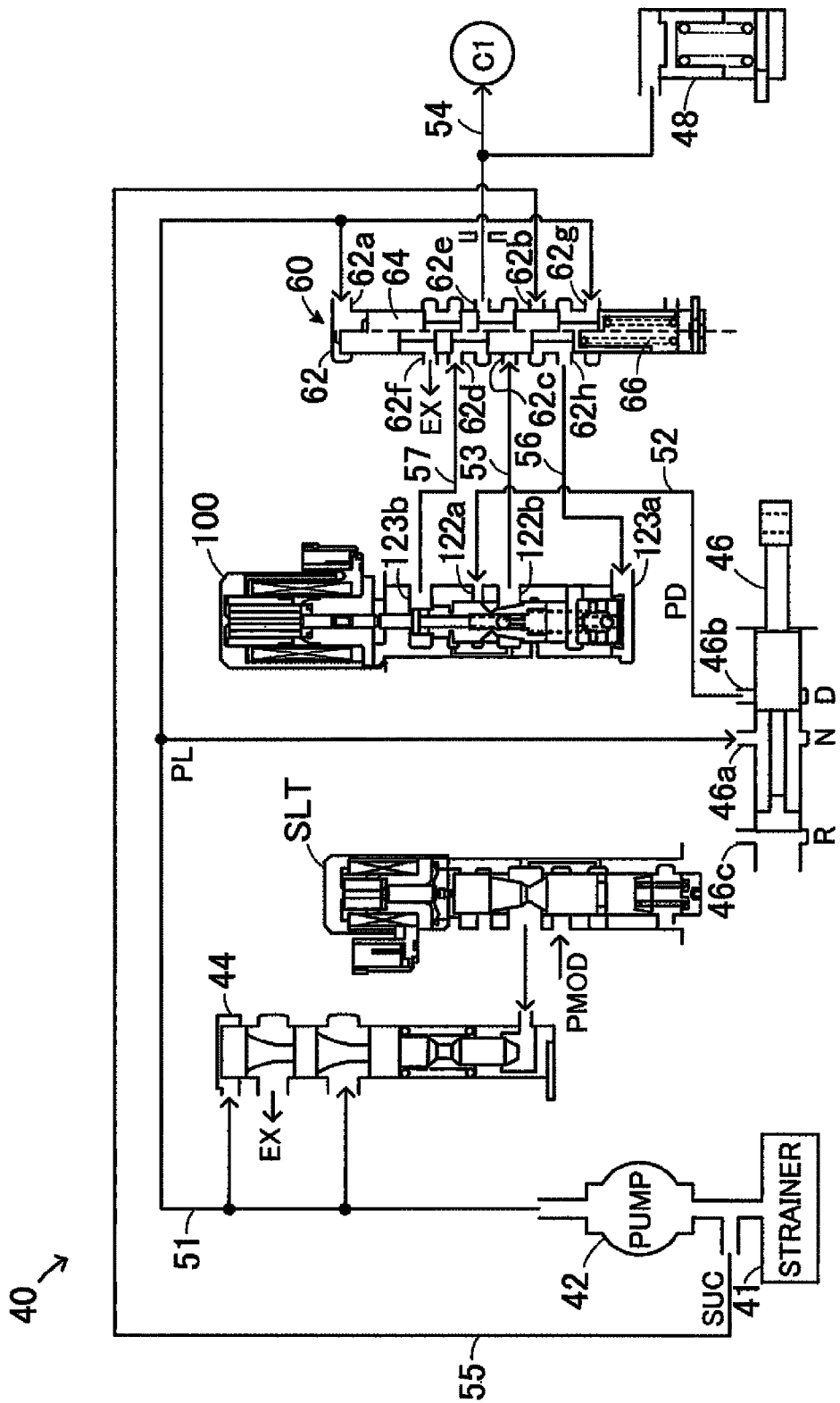
FIG. 4 is a schematic diagram showing the constitution of a hydraulic circuit 40.

The clutches C1 to C3 and the brakes B1, B2 of the automatic speed change mechanism 30 are switched ON and OFF by a hydraulic circuit 40. FIG. 4 is a schematic diagram showing the constitution of the hydraulic circuit 40. As shown in the drawing, the hydraulic circuit 40 is constituted by: a mechanical oil pump 42 that suctions working oil from an oil pan, not shown in the drawing, via a strainer 41 by power from the engine 12 and pumps the suctioned working oil to a line pressure oil passage 51; a regulator valve 44 that generates a line pressure PL by regulating an oil pressure in the line pressure oil passage 51; a linear solenoid SLT that drives the regulator valve 44 by regulating a modulator pressure PMOD generated from the line pressure PL via a modulator valve, not shown in the drawing, and outputting the regulated modulator pressure PMOD as a signal pressure; a manual valve 46 formed with an input port 46a that is connected to the line pressure oil passage 51 for inputting the line pressure PL, a drive position output port (D port) 46b, a reverse position output port (R port) 46c, and so on, and is operated in conjunction with an operation of the shift lever 91 to establish or block communication between the input port 46a and the respective output ports 46b, 46c; a solenoid valve 100 having an input port that is connected to the D port 46b of the manual valve 46 via a D port oil passage 52, the solenoid valve 100 functioning as a linear solenoid that inputs oil pressure from the D port 46b via an input port 122a, regulates the input oil pressure, and outputs the regulated oil pressure from an output port 122b, and also functioning as an electromagnetic pump that suctions working oil from the strainer 41 into a suction port 123a via a suction oil passage 55 and discharges the suctioned working oil from a discharge port 123b; a switch valve 60 that is connected to the line pressure oil passage 51, an output port oil passage 53 of the output port 122b a suction port oil passage 56 of the suction port 123a, and a discharge port oil passage 57 of the discharge port 123b of the solenoid valve 100, and a clutch oil passage 54 of the clutch C1, and is operated by the line pressure PL from the line pressure oil passage 51 to switch the respective oil passages between a communicating state and a blocked state; an accumulator 48 connected to the clutch oil passage 54 of the clutch C1; and so on. Note that hydraulic systems of the clutches C2, C3 other than the clutch C1 and hydraulic systems of the brakes B1, B2 do not form the core of the present invention and have therefore been omitted from FIG. 4. However, these hydraulic systems may be formed using conventional linear solenoids and so on. The solenoid valve 100 will be described in further detail below.

Figure 5:
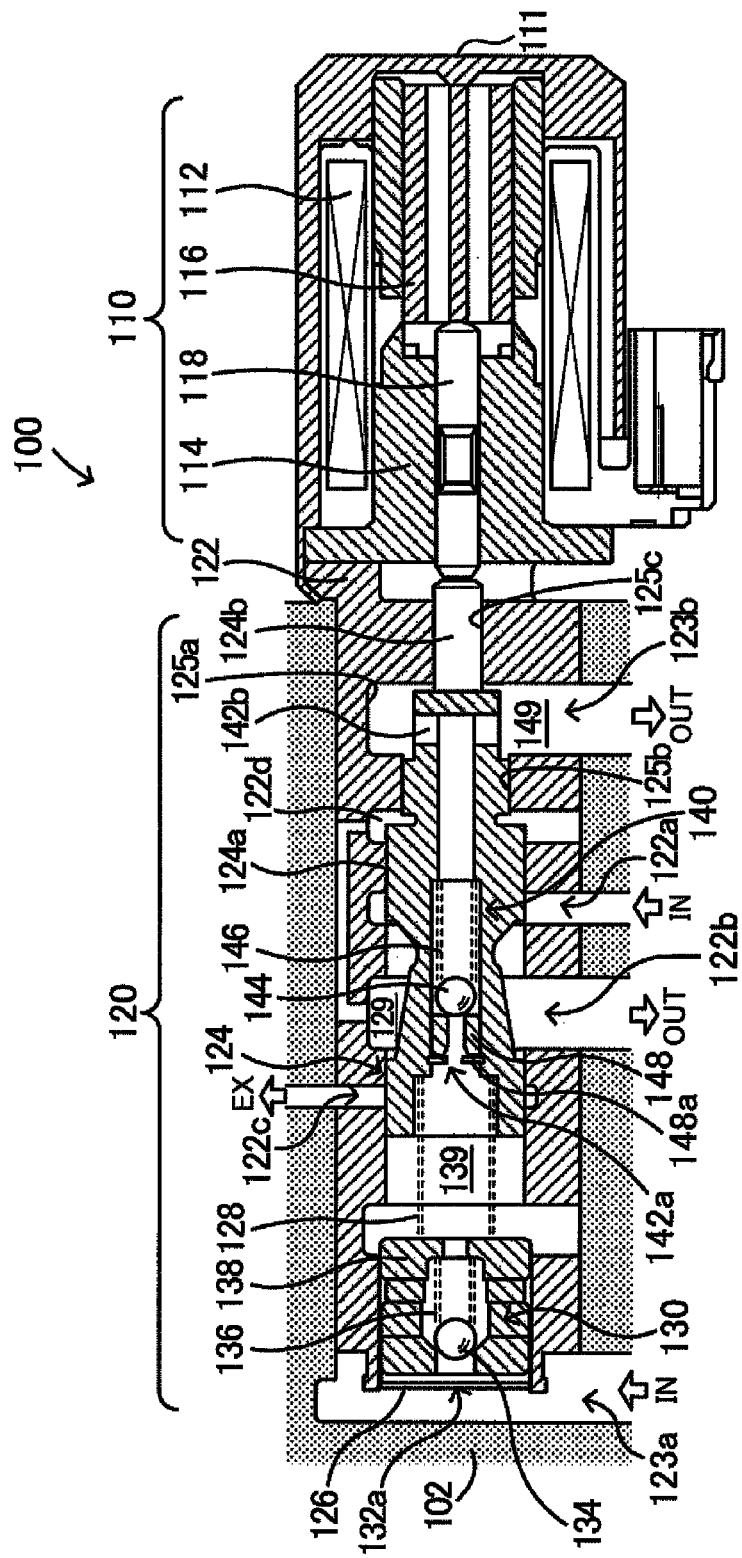
FIG. 5 is a schematic diagram showing the constitution of a solenoid valve 100.

FIG. 5 is a schematic diagram showing the constitution of the solenoid valve 100. As shown in the drawing, the solenoid valve 100 includes a solenoid unit 110 that pushes out a shaft 118 by attracting a plunger 116 using a magnetic circuit formed in a core 114 when a current is applied to an electromagnetic coil 112, and a valve unit 120 that is driven by the solenoid unit 110 via the shaft 118 to function as both a pressure regulating valve and an electromagnetic pump.

The valve unit 120 includes a substantially cylindrical sleeve 122 incorporated into a valve body 102, one end of which is attached to a case 111 of the solenoid unit 110, a spool 124 inserted into an interior space of the sleeve 122, one end of which contacts a tip end of the shaft 118 in the solenoid unit 110, an end plate 126 screwed to another end of the sleeve 122, and a spring 128 that biases another end of the spool 124 in the direction of the solenoid unit 110 using the end plate 126 as a spring bearing.

The spool 124 is formed from a substantially cylindrical spool main body 124a and a cylindrical shaft portion 124b that contacts the tip end of the shaft 118 in the solenoid unit 110 and has a smaller outer diameter than the spool main body 124a. The spool 124 is pushed out by the shaft 118 of the solenoid unit 110 so as to slide within the sleeve 122.

An input port 122a, an output port 122b, a drain port 122c, and a feedback port 122d are formed in an intermediate portion of the valve unit 120. To make the valve unit 120 function as a pressure regulating valve, a space surrounded by an outer wall of the spool 124 and an inner wall of the sleeve 122 is used as a pressure regulating chamber 129 such that oil pressure input to the input port 122a can be output from the output port 122b while regulating the oil pressure by discharging a part thereof to the drain port 122c.

A suction port 123a and a discharge port 123b are formed at either end portion of the valve unit 120. Further, a suction check valve 130 is incorporated into the end plate 126 to communicate with the suction port 123a, and a discharge check valve 140 is incorporated into the spool 124 to communicate with the discharge port 123b. Hence, using a space surrounded by the end plate 126, the spool 124, and the sleeve 122 as a pump chamber 139 and using the spool 124 as a piston, negative pressure is generated in the pump chamber 139 by an increase in an internal volume of the pump chamber 139 occurring when the spool 124 is pushed back by a biasing force of the spring 128, and the generated negative pressure opens the suction check valve 130 and closes the discharge check valve 140, whereby working oil is suctioned into the pump chamber 139 from the suction port 123a. Meanwhile, when the spool 124 is pushed out by an electromagnetic force from the solenoid unit 110, the internal volume of the pump chamber 139 decreases such that positive pressure is generated in the pump chamber 139, and the generated positive pressure closes the suction check valve 130 and opens the discharge check valve 140, whereby the working oil suctioned into the pump chamber 139 is discharged from the discharge port 123b. The suction check valve 130 includes: a hollow cylindrical main body that is integrated with the end plate 126 and formed with a central hole 132a having a step between a large diameter part and a small diameter part in an axial center so as to connect the pump chamber 139 and the suction port 123a; a ball 134 inserted into the central hole 132a; a spring 136 that pushes the ball 134 against the small diameter side of the main body; and a hollow cylindrical spring bearing 138 that is attached to the main body by press-fitting or screwing in order to receive the spring 136. Meanwhile, the discharge check valve 140 includes: a main body that is integrated with the spool 124, and includes a central hole 142a formed in an axial center in a recessed form so as to communicate with the pump chamber 139 and a through hole 142b formed in a radial direction communicating with the central hole 142a so as to communicate with the discharge port 123b; a spring 146 that is inserted into the central hole 142a such that a bottom of the central hole 142a serves as a spring bearing, a ball 144 that is inserted into the central hole 142a after the spring 146 is inserted therein; a hollow cylindrical ball bearing 148 that is inserted into the central hole 142a to receive the ball 144; and a snap ring 148a for fixing the ball bearing 148 to the main body 142.

Further, a sliding surface 125b on which the spool main body 124a slides and a sliding surface 125c that has a smaller inner diameter than the sliding surface 125b and on which the shaft portion 124b slides are formed via a step in the valve unit 120 on either side of a groove 125a cut into the entire periphery of the valve portion 120 in a site close to the solenoid unit 110 such that when the spool 124 is inserted, a space 149 surrounded by the groove 125a and a back surface of the spool main body 124a is formed. Since the spool 124 is fowled by the spool main body 124a and the shaft portion 124b having a smaller outer diameter than the spool main body 124a, the volume of the space 149 varies in an increasing direction when the spool 124 is pushed out by the electromagnetic force of the solenoid unit 110 and varies in a decreasing direction when the spool 124 is pushed back by the biasing force of the spring 128. The space 149 is formed such that volume variation therein is smaller than the volume variation of the pump chamber 139, and therefore, when the spool 124 is pushed out by electromagnetic force from the solenoid unit 110 as the electromagnetic coil 112 is energized, an amount of working oil corresponding to a difference between the reduction in the volume of the pump chamber 139 and the increase in the volume of the space 149 is transmitted from the pump chamber 139 via the discharge check valve 140 and discharged through the discharge port 123b, whereas when energization of the electromagnetic coil 112 is stopped such that the spool 124 is pushed back by the biasing force of the spring 128, an amount of working oil corresponding to the reduction in the volume of the space 149 is discharged from the discharge port 123b directly. Hence, the space 149 functions as a pump chamber for pumping working oil in the interior thereof when the spool 124 is pushed back by the biasing force of the spring 128. Hereafter, the space 149 will be referred to as a second pump chamber 149.

FIG. 6 is an illustrative view illustrating a pressure receiving area of a front surface of the spool 124 in the pump chamber 139 and a pressure receiving area of a back surface of the spool 124 in the second pump chamber 149. When a pressure receiving area of the front surface of the spool 124 in the pump chamber 139 is set as A1 and a pressure receiving area of the back surface of the spool 124 in the second pump chamber 149 is set as A2, a discharge pressure P1 of the working oil that is discharged from the pump chamber 139 via the discharge check valve 140 and the second pump chamber 149 in accordance with electromagnetic force from the solenoid unit 110 may be expressed by a following Equation (1), while a discharge pressure P2 of the working oil that is discharged directly from the second pump chamber 149 by a biasing force (spring force) F2 of the spring 128 can be expressed by a following Equation (2). Here, "F1" in the Equation denotes the electromagnetic force of the solenoid unit 110, "F2" denotes the spring force, and "F3" denotes a force generated in an opposite direction by the negative force that is generated in the pump chamber 139 when the spool 124 is pushed back by the spring force. Since the negative pressure force F3 is considerably smaller than the spring force F2 and the pressure receiving area A2 in the second pump chamber 149 is smaller than the pressure receiving area A1 in the pump chamber 139, the discharge pressure P2 can be made larger than the discharge pressure P1 by causing the spring force F2 to approach the electromagnetic force F1 (i.e. increasing the spring force F2) within a range (F1>F2) where the spool 124 can be pushed out by the electromagnetic force F1 against the spring force F2. In other words, a peak of the discharge pressure in each cycle of the overall electromagnetic pump 20 can be adjusted by setting the spring force F2 of the spring 128. As shown in Equation (2), when the diameter of the shaft portion 124b of the spool 124 is increased such that the pressure receiving area A2 of the spool 124 in the second pump chamber 149 decreases, the discharge pressure P2 generated due to a return motion of the spool 124 by the spring force F2 increases, leading to a reduction in a discharge amount. In this case, the discharge amount generated due to an outward motion of the spool 124 by the electromagnetic force F1 increases, and therefore the discharge amount per cycle remains unchanged.

$$P1=(F1-F2)/A1 \quad (1)$$

$$P2=(F2-F3)/A2 \quad (2)$$

As shown in FIG. 4, the switch valve 60 is constituted by a sleeve 62 formed with various ports, a spool 64 that slides in an axial direction within the sleeve 62, and a spring 66 that biases the spool 64 in the axial direction. As the various ports, the sleeve 62 is formed with a signal pressure input port 62a that is connected to the line pressure oil passage 51 for inputting the line pressure PL as a signal pressure, an input port 62b connected to the suction oil passage 55, which is coupled to the strainer 41 without passing through the mechanical oil pump 42, an input port 62c connected to the output port oil passage 53 (the output port 122b of the solenoid valve 100), an input port 62d connected to the discharge port oil passage 57 (the discharge port 123b of the solenoid valve 100), an output port 62e connected to the clutch oil passage 54 of the clutch C1, a drain port 62f, an input port 62g connected to the line pressure oil passage 51, and an output port 62h connected to the suction port oil passage 56 (the suction port 123a of the solenoid valve 100). When the line pressure PL is input into the signal pressure input port 62a, the spool 64 of the switch valve 60 moves to a position in a right half region of the valve shown in the drawing against the biasing force of the spring 66, thereby blocking communication between the input port 62b (the strainer 41) and the output port 62h (the suction port 123a), establishing communication between the input port 62g (the pump oil passage 55) and the output port 62h (the suction port 123a), establishing communication between the input port 62c (the output port 122b) and the output port 62e (the clutch C1), blocking communication between the input port 62d (the discharge port 123b) and the output port 62e (the clutch C1), and establishing communication between the input port 62d (the discharge port 123b) and the drain port 62f. When the line pressure PL is not input into the signal pressure input port 62a, on the other hand, the spool 64 is moved to a position in a left half region of the valve shown in the drawing by the biasing force of the spring 66, thereby establishing communication between the input port 62b (the strainer 41) and the output port 62h (the suction port 123a), blocking communication between the input port 62g (the pump oil passage 55) and the output port 62h (the suction port 123a), blocking communication between the input port 62c (the output port 122b) and the output port 62e (the clutch C1), establishing communication between the input port 62d (the discharge port 123b) and the output port 62e (the clutch C1), and blocking communication between the input port 62d (the discharge port 123b) and the drain port 62f.

In a case where the vehicle 10 according to this embodiment, constituted as described above, travels with the shift lever 91 in a D (drive) traveling position, the engine 12 is automatically stopped when all of a plurality of preset automatic stopping conditions are established, for example, when the vehicle speed V is zero, the accelerator is OFF, a brake switch signal BSW is ON, and so on. Once the engine 12 has been automatically stopped, the automatically stopped engine 12 is automatically started when a preset automatic starting condition is established thereafter, for example, when the brake switch signal BSW is turned OFF or the like.

When the automatic stopping conditions are established in the vehicle 10 according to this embodiment such that the engine 12 is automatically stopped, the mechanical oil pump 42 also stops, and therefore the line pressure PL escapes and the switch valve 60 blocks communication between the output port 122b of the solenoid valve 100 (the output port oil passage 53) and the clutch C1 (the clutch oil passage 54) and establishes communication between the discharge port 123b of the solenoid valve 100 (the discharge port oil passage 57) and the clutch C1. By causing the solenoid valve 100 to function as an electromagnetic pump when the shift lever 91 is in the D position, oil pressure can be exerted on the clutch C1. When the automatic starting condition is subsequently established such that the stopped engine 12 is automatically started, the mechanical oil pump 42 is activated, and therefore the line pressure PL is supplied and the switch valve 60 establishes communication between the output port 122b of the solenoid valve 100 and the clutch C1 and blocks communication between the discharge port 123b of the solenoid valve 100 and the clutch C1. Hence, by causing the solenoid valve 100 to function as a pressure regulating valve, the clutch C1 can be fully engaged, allowing the vehicle to start traveling. By causing the solenoid valve 100 to function as an electromagnetic pump while the engine 12 is automatically stopped such that oil pressure is exerted on the clutch C1 in this manner, the clutch C1 can be engaged quickly immediately after the engine 12 is automatically started, and therefore the vehicle 10 can start to travel smoothly.

A state in which the engine 12 is operative will now be considered. In this state, the switch valve 60 establishes communication between the input port 62g (the pump oil passage 55) and the output port 62h (the suction port 123a), between the input port 62c (the output port 122b) and the output port 62e (the clutch C1), and between the input port 62d (the discharge port 123b) and the drain port 62f. Therefore, the solenoid valve 100 is caused to function as a pressure regulating valve, whereby oil pressure from the mechanical oil pump 42 is regulated and exerted on the clutch C1, and the working oil that is suctioned from the oil pan and pumped by the mechanical oil pump 42 flows back to the oil pan via the input port 62g and output port 62h of the switch valve 60, the suction port 123a, suction check valve 130, pump chamber 139, discharge check valve 140 and discharge port 123b of the solenoid valve 100, and the input port 62d and drain port 62f of the switch valve 60, in that order, thereby forming a circulation circuit. Hence, even when the function as an electromagnetic pump is stopped, an air pocket is not generated in the pump chamber 139. Therefore, when the solenoid valve 100 is caused to function as an electromagnetic pump while the engine 12 is automatically stopped, a startup delay caused by an air pocket can be prevented.

With the power transmission apparatus 20 according to this embodiment, described above, a circulation circuit is formed by the switch valve 60 while the mechanical oil pump 42 is operative such that working oil circulates from the mechanical oil pump 42 via the input port 62g, the output port 62h, the suction port 123a, suction check valve 130, pump chamber 139, discharge check valve 140 and discharge port 123b of the solenoid valve 100, and the input port 62d and drain port 62f of the switch valve 60, in that order, and therefore generation of an air pocket in the pump chamber 139 can be suppressed when the solenoid valve 100 is caused to function as a pressure regulating valve instead of an electromagnetic pump. As a result, the solenoid valve 100 can be started quickly when subsequently caused to function as an electromagnetic pump, enabling an improvement in the performance of the solenoid valve 100. Moreover, by providing the solenoid valve 100 with an electromagnetic pump function and building the suction check valve 130 and discharge check valve 140 into the solenoid valve 100, the volume of the pump chamber 139 can be reduced, and therefore intermixing of air can be suppressed further. Furthermore, by forming the pump chamber 139 from the inner wall of the sleeve 122 and the front surface of the spool main body 124a, forming the sliding surface 125b on which the spool main body 124a slides and the sliding surface 125c on which the shaft portion 124b slides via a step on either side of the groove 125a cut into the entire periphery of the inner wall of the sleeve 122, and forming the second pump chamber 149 from the groove 125a and the back surface of the spool main body 124a when the spool 124 is inserted, the working oil can be pumped efficiently, enabling a further improvement in the pump performance.

In the power transmission apparatus 20 according to this embodiment, the switch valve 60 switches between establishing and blocking communication between the output port 122b of the solenoid valve 100 and the clutch C1, switches between establishing and blocking communication between the suction oil passage 55 (the strainer 41) and the suction port 123a of the solenoid valve 100 and between the suction port 123b and the clutch C1, and switches between establishing and blocking communication between the line pressure oil passage 51 (the mechanical oil pump 42) and the suction port 123a of the solenoid valve 100 and between the suction port 123b and the drain port 62f of the switch valve 60 using a single valve. However, each of these switches may be performed using two or three valves. Note, however, that when a single switch valve is used, the entire apparatus can be made more compact and a reduction in cost can be achieved.

In the power transmission apparatus 20 according to this embodiment, the switch valve 60 is driven using the line pressure PL, but the switch valve 60 may be driven using the modulator pressure PMOD, which is obtained by reducing the line pressure PL via a modulator valve, not shown in the drawings. Alternatively, the line pressure PL or the modulator pressure PMOD may be supplied to the switch valve 60 via a solenoid valve such that the switch valve 60 is driven using this solenoid valve.

In the power transmission apparatus 20 according to this embodiment, the solenoid valve 100 (pressure regulating valve) is constituted by a direct control pressure regulating valve that controls the clutch C1 directly by generating an optimum clutch pressure from the line pressure PL. However, a separate control valve may be driven using the pressure regulating valve as a pilot control valve such that the clutch pressure is generated and the clutch C1 is controlled by this control valve.

Figure 7:
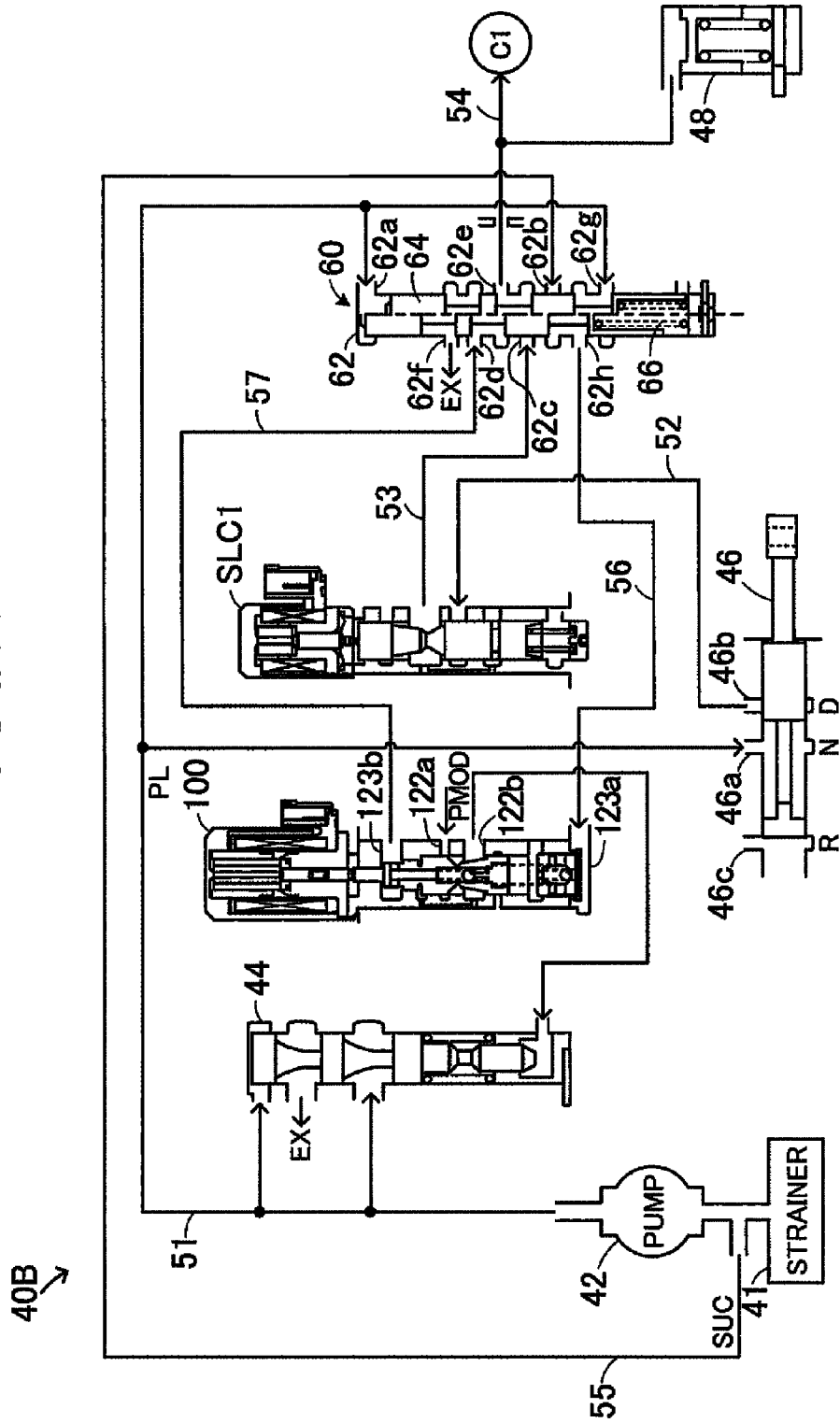
FIG. 7 is a schematic diagram showing the constitution of a hydraulic circuit 40B according to a modified example.

In the power transmission apparatus 20 according to this embodiment, the solenoid valve 100 is caused to function as an electromagnetic pump that applies oil pressure to the clutch C1 and as a pressure regulating valve that likewise applies oil pressure to the clutch C1. However, the solenoid valve 100 is not limited thereto, and may be caused to function as any other type of pressure regulating valve, such as a pressure regulating valve that applies a signal pressure to the regulator valve 44, for example. FIG. 7 shows a hydraulic circuit 40B according to a modified example in which the solenoid valve 100 is caused to function as a pressure regulating valve for driving the regulator valve 44. As shown in the drawing, the hydraulic circuit 40B according to this modified example is constituted to output a signal pressure for driving the regulator valve 44 from the output port 122b of the solenoid valve 100, instead of the linear solenoid SLT according to the embodiment, input the line pressure PL from the D port 46b of the manual valve 50 to an input port of a linear solenoid SLC1 via the D port oil passage 52, regulate the input line pressure PL, and output the regulated pressure from an output port to the clutch C1 via the output port oil passage 53 and the input port 62c and output port 62e of the switch valve 60.

Figure 8:
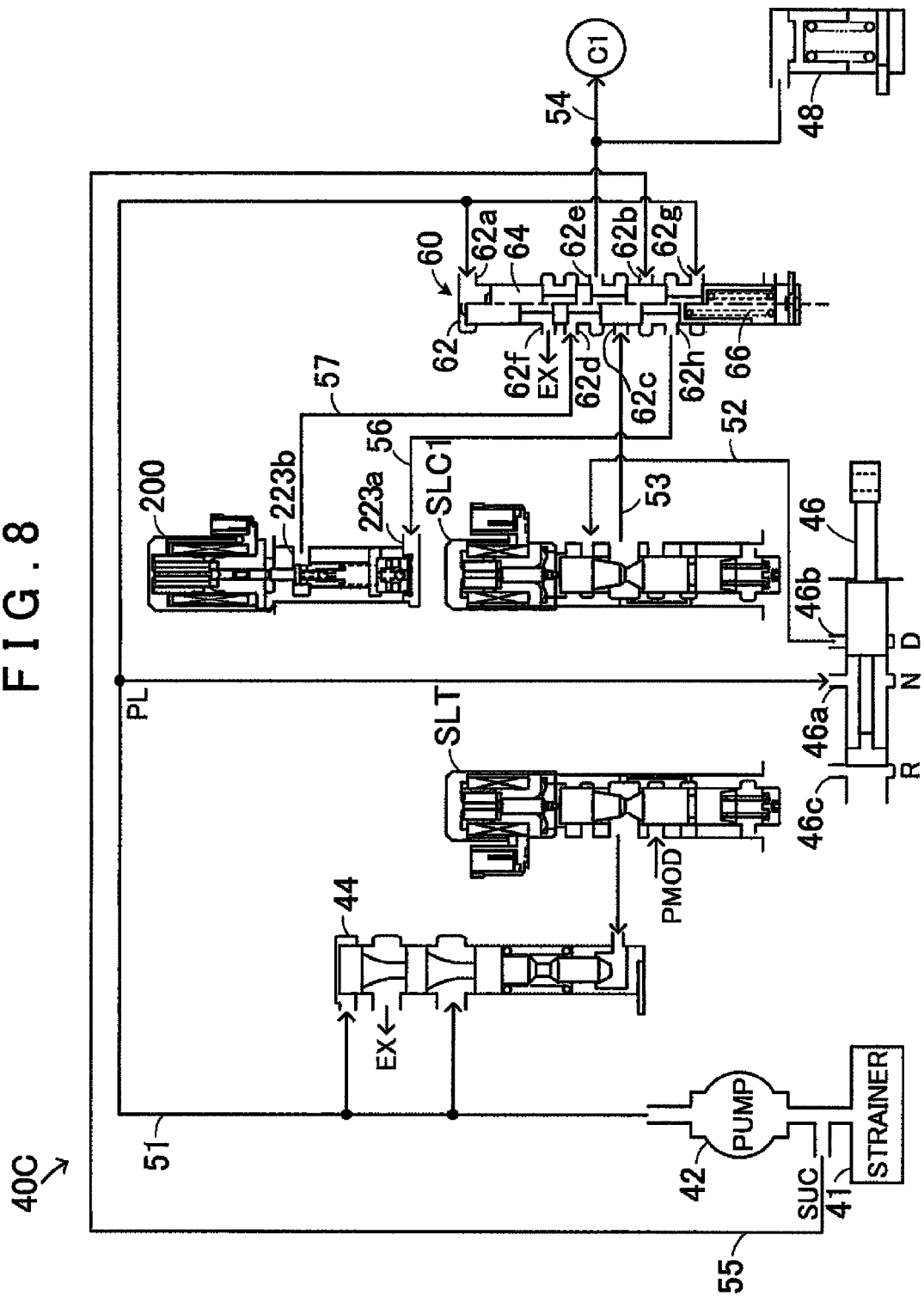
FIG. 8 is a schematic diagram showing the constitution of a hydraulic circuit 40C according to a modified example.
Figure 9:
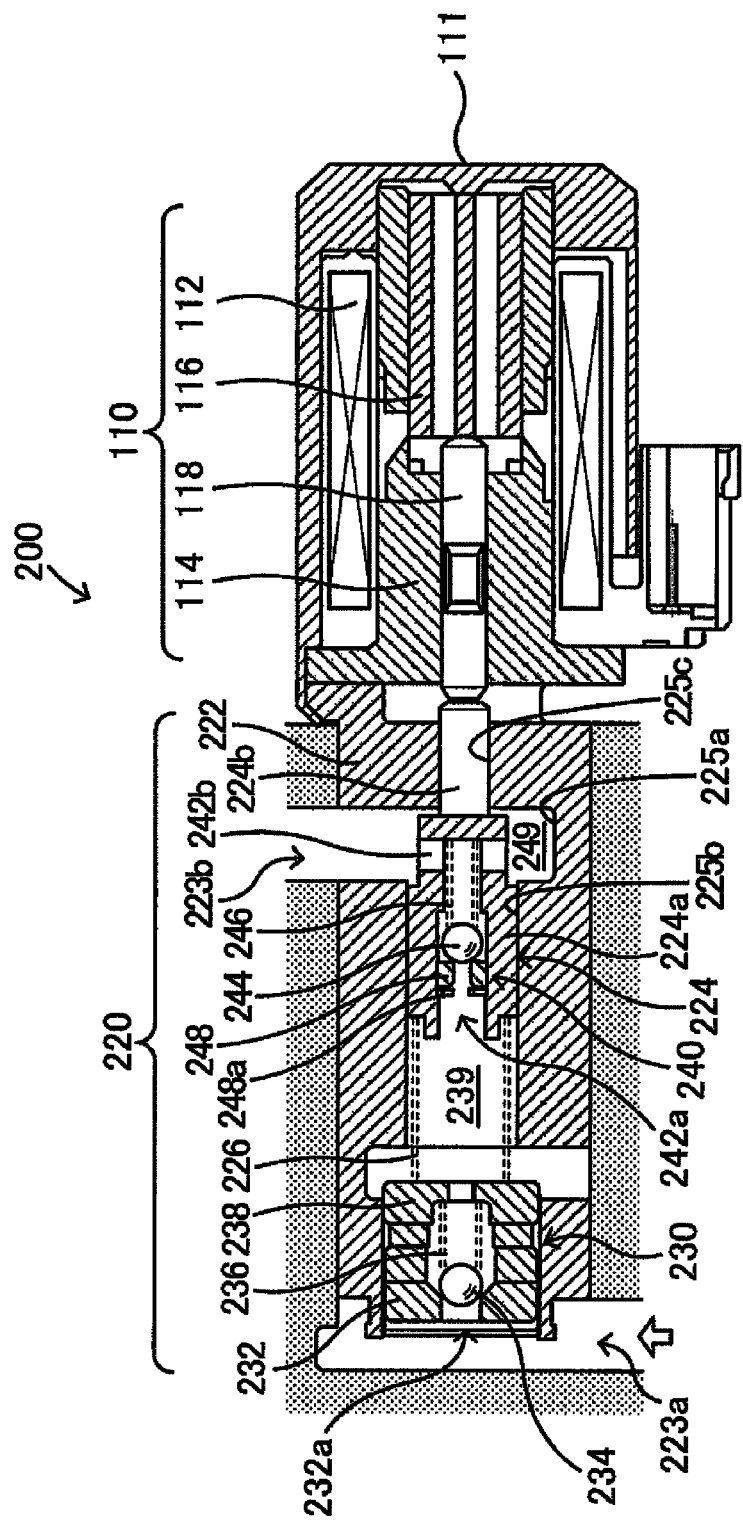
FIG. 9 is a schematic diagram showing the constitution of an electromagnetic pump 200.

In the power transmission apparatus 20 according to this embodiment, the solenoid valve 100 is provided with a function as a pressure regulating valve and a function as an electromagnetic pump, but a pressure regulating valve and an electromagnetic pump may be provided separately. FIG. 8 shows a hydraulic circuit 40C of a modified example in this case. As shown in the drawing, the hydraulic circuit 40C according to this modified example includes, in place of the solenoid valve 100 according to the embodiment, the linear solenoid SLC1 that is input with the line pressure PL from the D port 46b of the manual valve 46 through an input port via the D port oil passage 52, regulates the input line pressure PL, and outputs the regulated pressure from an output port to the clutch C1 via the output port oil passage 53 and the input port 62c and output port 62e of the switch valve 60, and an electromagnetic pump 200 in which a suction port 223a is connected to the suction port oil passage 56 (the output port 62h of the switch valve 60) and a discharge port 223b is connected to the discharge port oil passage 57 (the input port 62d). The constitution of the electromagnetic pump 200 will now be described in further detail. FIG. 9 is a schematic diagram showing the constitution of the electromagnetic pump 200. Note that in FIG. 9, a solenoid unit 110 of the electromagnetic pump 200 is similar to the solenoid unit 110 of the solenoid valve 100 used in the embodiment and is therefore allocated an identical reference numeral.

As shown in the drawing, the electromagnetic pump 200 includes the solenoid unit 110 for generating an electromagnetic force, and a pump unit 220 that is driven by the electromagnetic force from the solenoid unit 110 to pump working oil. The pump unit 220 includes: a hollow cylindrical cylinder 222; a piston 224 that is inserted into the cylinder 222 and disposed to be capable of sliding coaxially with the shaft 118 of the solenoid unit 110; a spring 226 that applies a biasing force to the piston 224 in an opposite direction to the electromagnetic force of the solenoid unit 110; a suction check valve 230 that is disposed in an end portion of the cylinder 222 and also functions as an end plate for receiving the spring 226; and a discharge check valve 240 that is likewise disposed in the cylinder 222, a main body of which is molded integrally with a piston main body 224a. The piston 224 is formed from the cylindrical piston main body 224a and a shaft portion 224b that contacts a tip end of the shaft 118 in the solenoid unit 110 and has a smaller outer diameter than the piston main body 224a, and thus the piston 224 slides within the cylinder 222 when pushed out by the shaft 118 of the solenoid unit 110. The suction check valve 230, similarly to the suction check valve 130 of the solenoid valve 100 according to the embodiment, includes: a hollow cylindrical main body 232 in which a central hole 232a having a step between a large diameter part and a small diameter part is formed in an axial center thereof; a ball 234 inserted into the central hole 232a; a spring 236 that pushes the ball 234 against the small diameter side of the main body 232; and a hollow cylindrical spring bearing 238 that is attached to the main body 232 by press-fitting or screwing in order to receive the spring 236. Meanwhile, the discharge check valve 240 includes: a main body that is integrated with the piston main body 224a, and includes a central hole 242a formed in an axial center thereof in a recessed form and a through hole 242b formed in a radial direction and communicating with the central hole 242a; a spring 246 that is inserted into the central hole 242a such that a bottom of the central hole 242a serves as a spring bearing; a ball 244 that is inserted into the central hole 242a after the spring 246 is inserted therein; a hollow cylindrical ball bearing 248 that is inserted into the central hole 242a to receive the ball 244; and a snap ring 248a for fixing the ball bearing 248 to the main body (the piston main body 224a). Similarly to the solenoid valve 100 according to the embodiment, a space surrounded by the suction check valve 230, a front surface of the piston main body 224a (the discharge check valve 240), and an inner wall of the cylinder 222 is used as a pump chamber 239, and a space surrounded by a back surface of the piston main body 224a, an inner wall of the cylinder 222 (a groove 225a and sliding surfaces 225a, 225b) is used as a second pump chamber 249.

Figure 10:
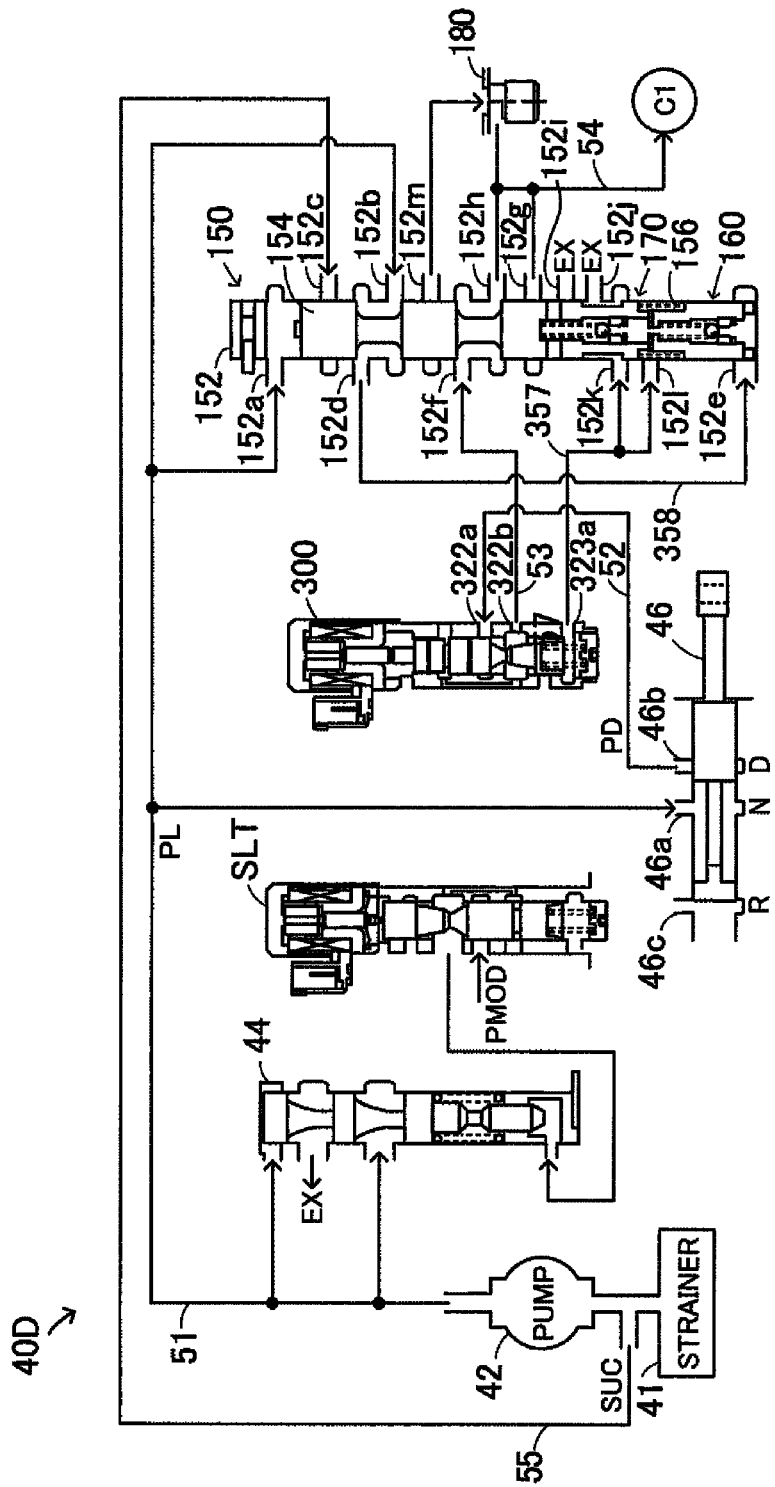
FIG. 10 is a schematic diagram showing the constitution of a hydraulic circuit 40D according to a modified example.
Figure 11:
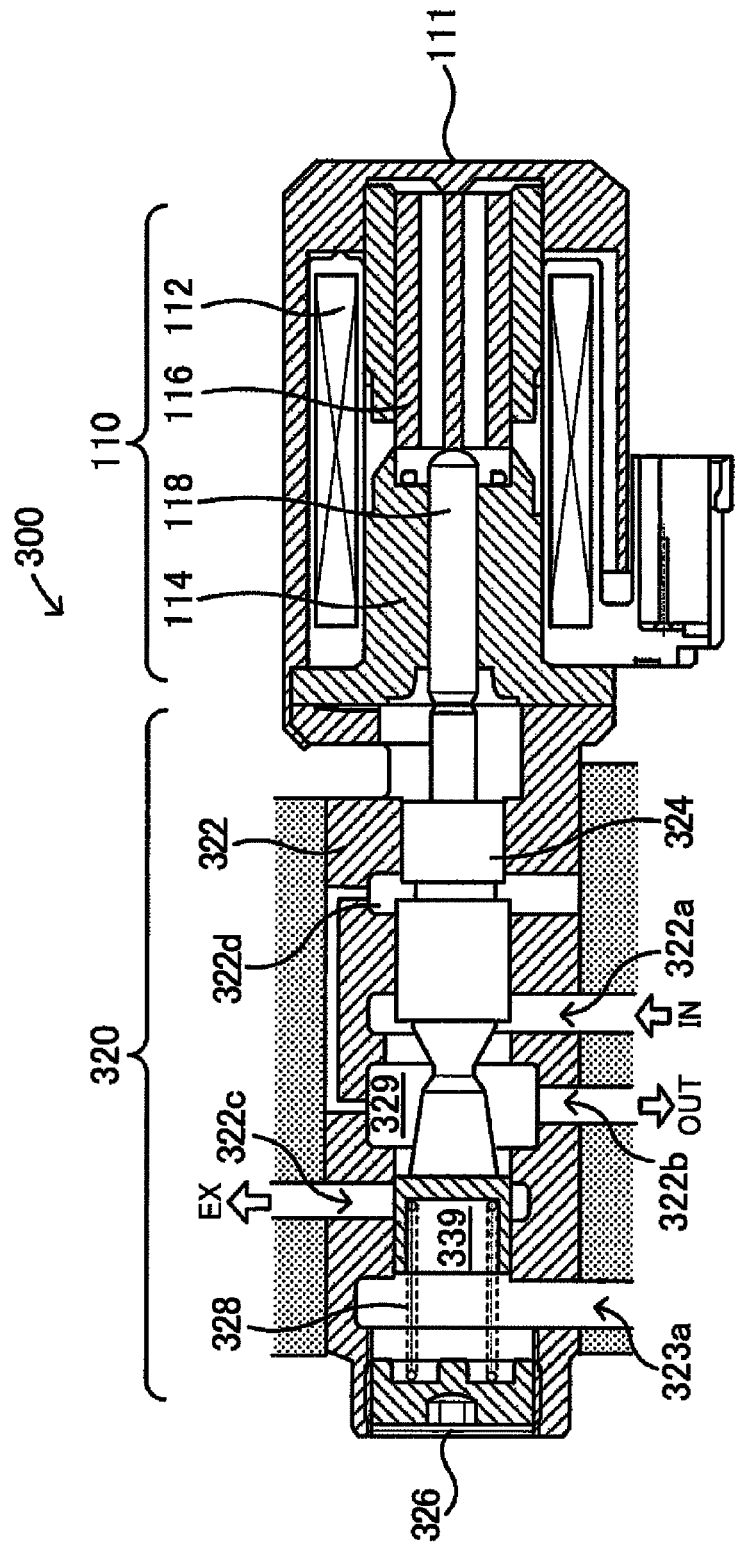
FIG. 11 is a schematic diagram showing the constitution of a solenoid valve 300 according to a modified example.

In the power transmission apparatus 20 according to this embodiment, the suction check valve 130 and the discharge check valve 140 are built into the sleeve 122 of the solenoid valve 100, but the suction check valve 130 and discharge check valve 140 need not be inbuilt. FIG. 10 is a schematic diagram showing the constitution of a hydraulic circuit 40D according to a modified example in this case. As shown in the drawing, the hydraulic circuit 40D according to this modified example includes, in place of the solenoid valve 100 and the switch valve 60, a solenoid valve 300 that functions as both a pressure regulating valve and an electromagnetic pump, and a switch valve 150 in which a suction check valve 160 and a discharge check valve 170 are inbuilt. FIG. 11 is a schematic diagram showing the constitution of the solenoid valve 300.

As shown in the drawing, the solenoid valve 300 includes the solenoid unit 110 for generating an electromagnetic force, and a valve unit 320 that is driven by the solenoid unit 110 via the shaft 118 to function as a pressure regulating valve and an electromagnetic pump. The valve unit 320 includes a substantially cylindrical sleeve 322, a spool 324 inserted into an interior space of the sleeve 322, one end of which contacts a tip end of the shaft 118 in the solenoid unit 110, an end plate 326 screwed to another end of the sleeve 322, and a spring 328 that biases the spool 324 in the direction of the solenoid unit 110 using the end plate 326 as a spring bearing. An input port 322a, an output port 322b, a drain port 322c, and a feedback port 322d are formed in an intermediate portion of the valve unit 320, and when the valve unit 320 is caused to function as a pressure regulating valve, a space surrounded by an outer wall of the spool 324 and an inner wall of the sleeve 322 is used as a pressure regulation chamber 329 such that oil pressure input into the input port 322a can be output from the output port 322b while regulating the pressure of the oil pressure by discharging a part thereof to the drain port 322c. Further, the valve unit 320 is formed with a spring chamber port 323a that communicates with a spring chamber 339 that is surrounded by the inner wall of the sleeve 322, the spool 324, and the end plate 326, and houses the spring 328.

Figure 12:
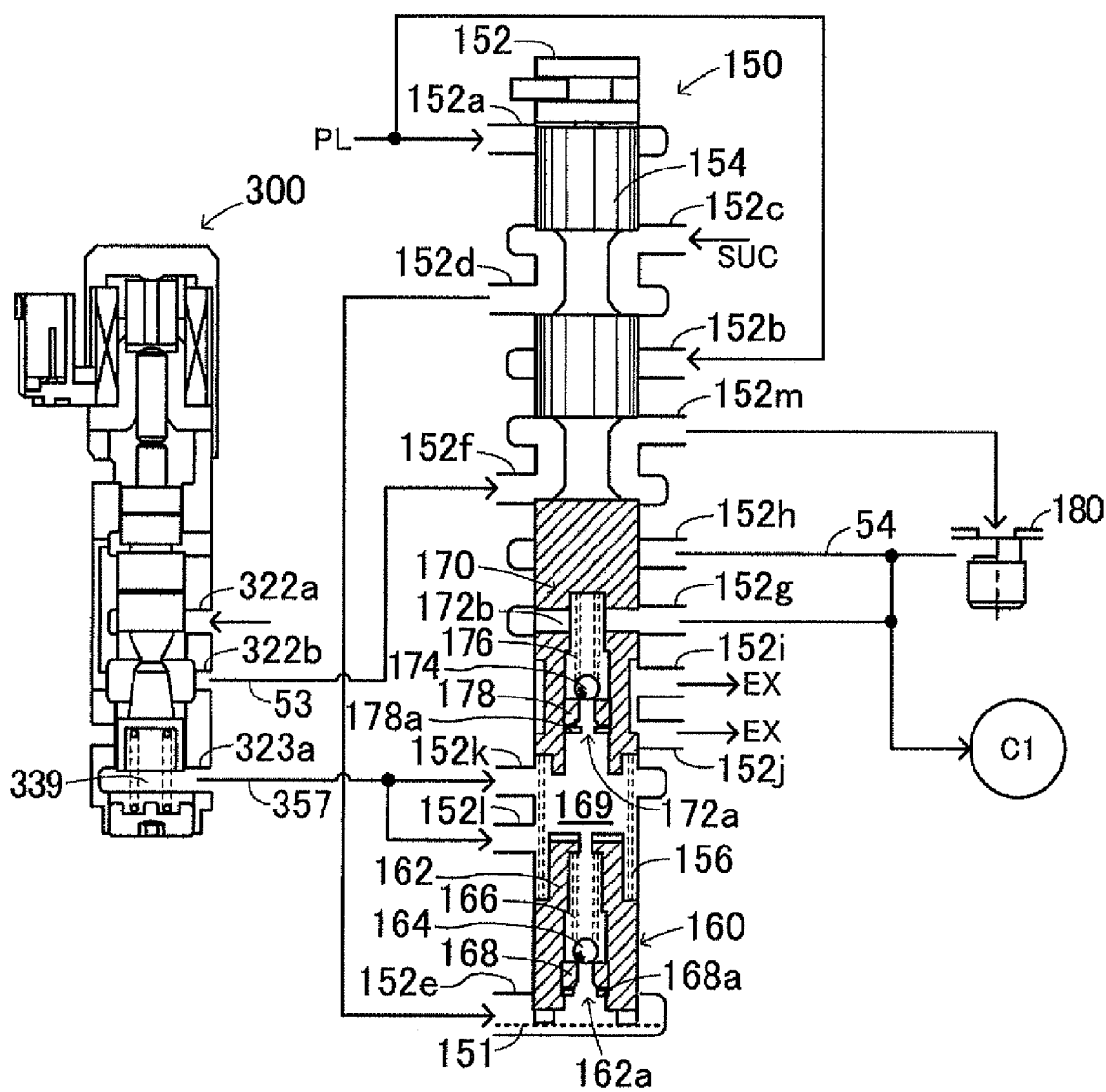
FIG. 12 is an enlarged view of the solenoid valve 300 and a switch valve 150 in the hydraulic circuit 40D shown in FIG. 10.
Figure 13:
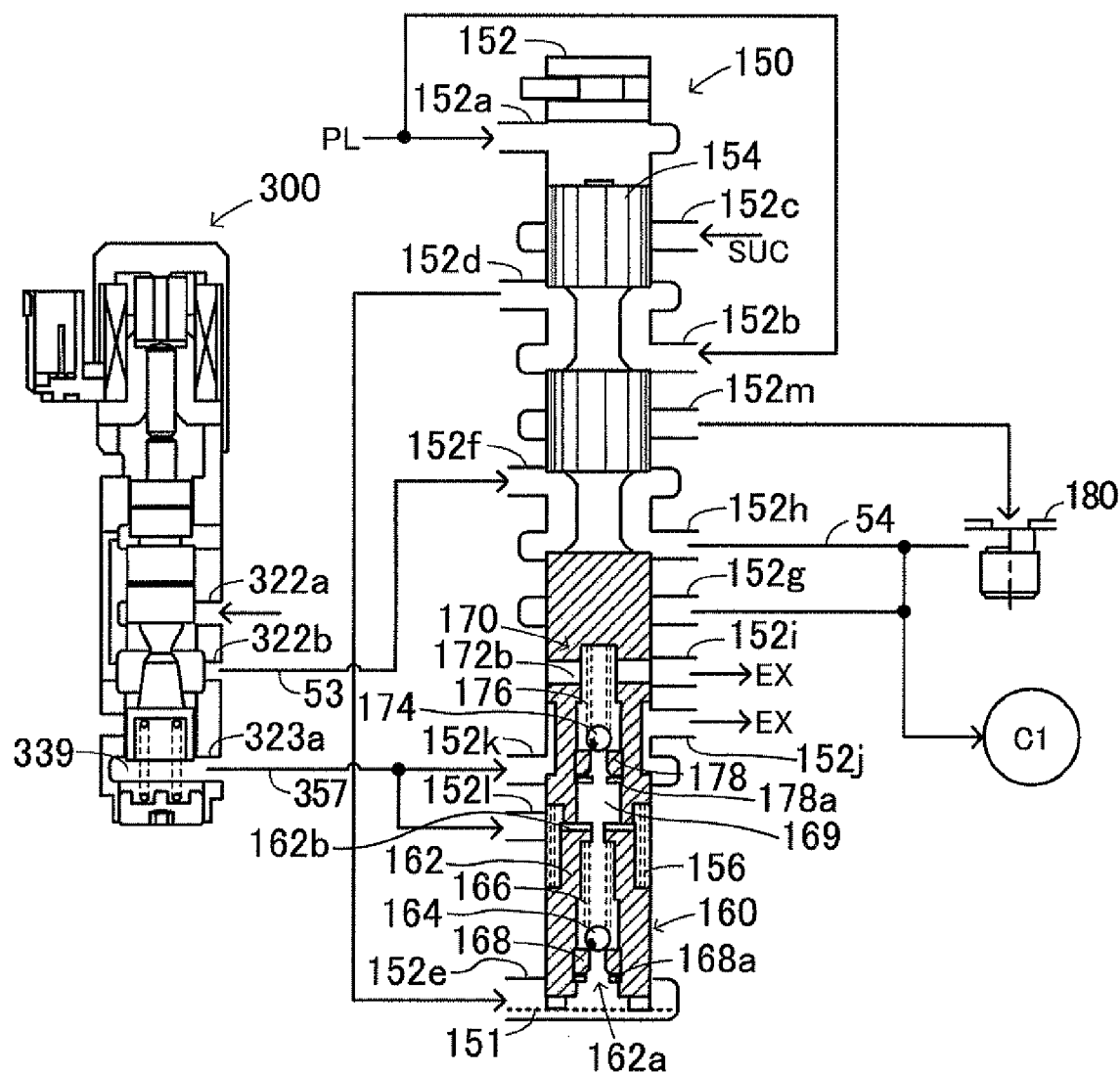
FIG. 13 is an enlarged view of the solenoid valve 300 and the switch valve 150 in the hydraulic circuit 40D shown in FIG. 10.

FIGS. 12 and 13 are enlarged views of the solenoid valve 300 and the switch valve 150 in the hydraulic circuit 40D shown in FIG. 10. As shown in FIGS. 10, 12 and 13, the switch valve 150 includes, as various ports formed in the sleeve 152, a signal pressure input port 152a connected to the line pressure oil passage 51 (the mechanical oil pump 42), an input port 152b likewise connected to the line pressure oil passage 51, an input port 152c connected to the suction oil passage 55 (the strainer 41), an output port 152d, an input port 152e connected to the output port 152d via a communication flow passage 358, an input port 152f connected to the output port oil passage 53 (the output port 322b of the solenoid valve 300), two output ports 152g, 152h connected to the clutch oil passage 54 (the clutch C1), two drain ports 152i, 152j, two input ports 152k, 152l connected to the spring chamber oil passage 357 of the solenoid valve 300 (the spring chamber 339), and an output port 152m connected to the clutch oil passage 54 via a check valve 180. Further, the discharge check valve 170 is disposed in the switch valve 150 in a state where the suction check valve 160 is disposed in the sleeve 152 and the spool 64 is incorporated. The spool 154, the discharge check valve 170, and the suction check valve 160 are disposed in the switch valve 150 in that order, and the spring 156 is provided between the discharge check valve 160 and the suction check valve 170. Hence, the spring 156 biases the spool 154 together with the discharge check valve 170 using the suction check valve 160 as a spring bearing. The suction check valve 160 includes: a hollow cylindrical main body 162 in which a central hole 162a having a step between a large diameter part and a small diameter part is formed in an axial center; a spring 166 that is inserted into the central hole 162a using the step portion of the main body 162 as a spring bearing; a ball 164 that is inserted into the central hole 162a from the large diameter side after the spring 166 is inserted therein; a hollow cylindrical ball bearing 168 inserted into the central hole 162a; and a snap ring 168a for fixing the ball bearing 168 to the main body 162. Meanwhile, the discharge check valve 170 includes: a cylindrical main body that is formed integrally with the spool 154 and includes a recessed central hole 172a having a step between a large diameter part and a small diameter part and formed in an axial center and a through hole 172b communicating with the central hole 172a and formed in a radial direction; a spring 176 that is inserted into the central hole 172a such that a bottom of the central hole 172a serves as a spring bearing; a ball 174 that is inserted into the central hole 172a from the large diameter side after the spring 176 is inserted therein; a hollow cylindrical ball bearing 178 that is inserted into the central hole 172a; and a snap ring 178a for fixing the ball bearing 178 to the main body. Note that a projecting portion 151 is formed in the sleeve 152 for connecting the input port 152e and the central hole 162a in the radial direction when the suction check valve 160 contacts an end surface of the sleeve 152.

When the line pressure PL does not act on the signal pressure input port 152a, the spool 154 moves upward in the drawing in accordance with expansion of the spring 156, whereby the switch valve 150 blocks communication between the input port 152b (the mechanical oil pump 42) and the output port 152d (the input port 152e), establishes communication between the input port 152c (the strainer 41) and the output port 152d (the input port 152e), establishes communication between the input port 152e and the output port 152g (the clutch C1) via the suction check valve 160 and the discharge check valve 170, blocks communication between the input port 152e and the drain port 152i, and establishes communication between the input port 152f (the output port 322b of the solenoid valve 300) and the output port 152m (the check valve 180) (see FIG. 12). The input ports 152k, 152l of the switch valve 150 are connected to the spring chamber port 323a of the solenoid valve 300 via the spring chamber oil passage 357, and therefore a space (pump chamber) 169 surrounded by the suction check valve 160 and the discharge check valve 170 communicates with the spring chamber 339 of the solenoid valve 300 via the spring chamber port 323a, the spring chamber oil passage 357, and the input ports 152k, 152l. When the spool 324 is pushed back by the biasing force of the spring 328 from a state in which the spool 324 is pushed out in the solenoid valve 300, negative pressure is generated in the pump chamber 169 by negative pressure generated due to an increase in the volume of the spring chamber 339, and as a result, the suction check valve 160 opens and the discharge check valve 170 closes such that working oil is suctioned into the pump chamber 169 from the strainer 41 via the input port 152c, output port 152d, input port 152e and suction check valve 160 (central hole 162a) of the switch valve 150, in that order. When the spool 324 is subsequently pushed out by electromagnetic force, positive pressure is generated in the pump chamber 169 by positive pressure generated due to a reduction in the volume of the spring chamber 339, and as a result, the suction check valve 160 closes and the discharge check valve 170 opens such that the working oil suctioned into the pump chamber 169 is discharged to the clutch C1 via the discharge check valve 170 (the central hole 172a and the through hole 172b) and the output port 152g, in that order. Hence, by driving and stopping the solenoid unit 110 repeatedly within a fixed period, the solenoid valve 300 can be caused to function as an electromagnetic pump that pumps working oil to the clutch C1. When the line pressure PL acts on the signal pressure input port 152a, on the other hand, the spool 154 moves downward in the drawing in accordance with compression of the spring 156, whereby the switch valve 150 establishes communication between the input port 152b (the mechanical oil pump 42) and the output port 152d (the input port 152e), blocks communication between the input port 152c (the strainer 41) and the output port 152d (the input port 152e), blocks communication between the input port 152e and the output port 152g (the clutch C1), establishes communication between the input port 152e and the drain port 152i via the suction check valve 160 and the discharge check valve 170, and establishes communication between the input port 152f (the output port 322b of the solenoid valve 300) and the output port 152h (the clutch C1) (see FIG. 13). Hence, the solenoid valve 300 is caused to function as a pressure regulating valve such that regulated oil pressure can be applied to the clutch C1 from the output port 322b of the solenoid valve 300. Further, when the line pressure PL acts on the signal pressure input port 152a, the main body 162 of the suction check valve 160 contacts the discharge check valve 170, and in this state, a communication groove 162b communicating with the input port 152l is formed in the suction check valve 160 in the radial direction. Since the input port 152l of the switch valve 150 is connected to the spring chamber port 323a of the solenoid valve 300, the pump chamber 169 communicates with the spring chamber 339 of the solenoid valve 300 via the spring chamber port 323a, the spring chamber oil passage 357, the input port 152l, and the communication groove 162b. Accordingly, the working oil suctioned from the oil pan and pumped by the mechanical oil pump 42 flows back to the oil pan via the input port 152b, output port 152d, input port 152e, suction check valve 160 (central hole 162a), pump chamber 169, discharge check valve 170 (central hole 172a, through hole 172b) and drain port 152i of the check valve 150, in that order, thereby forming a circulation circuit. As a result, an air pocket is not generated in the pump chamber 169.

Correspondence relationships between the main elements of the embodiment and the main elements of the invention described in the Summary of the Invention will now be described. In the embodiment, the suction check valve 130, 160, 230 corresponds to a "first open/close valve", the discharge check valve 140, 170, 240 corresponds to a "second open/close valve", the solenoid valve 100, 300 capable of functioning as an electromagnetic pump and the electromagnetic pump 200 correspond to a "first pump", the mechanical oil pump 42 corresponds to a "second pump", the suction oil passage 55, the input port 62b and output port 62h of the switch valve 60, the suction port oil passage 56, the solenoid valve 100, the discharge port oil passage 57, the input port 62d and output port 62e of the switch valve 60, and the clutch oil passage 54 correspond to a "first flow passage", the line pressure oil passage 51, the input port 62g and output port 62h of the switch valve 60, the suction port oil passage 56, the solenoid valve 100, the discharge port oil passage 57, and the input port 62d and drain port 62f of the switch valve 60 correspond to a "second flow passage", and the switch valve 60 corresponds to a "selector". Further, the suction oil passage 55, the input port 152c and output port 152d of the switch valve 150, the communication flow passage 358, the input port 152e and output port 152h of the switch valve 150, and the clutch oil passage 54 also correspond to the "first flow passage", and the line pressure oil passage 51, the input port 152b and output port 152d of the switch valve 150, the communication flow passage 358, and the input port 152e and drain port 152i of the switch valve 150 also correspond to the "second flow passage". Further, the pump chamber 139, 239 corresponds to a "first fluid chamber", and the second pump chamber 149, 249 corresponds to a "second fluid chamber". The engine 12 corresponds to a "motor", the automatic speed change mechanism 30, the hydraulic circuit 40, and so on correspond to a "power transmission apparatus", the clutch C1 and so on correspond to a "frictional engagement element", and the line pressure oil passage 51, the input port 46a and D port 46b of the manual valve 46, the D port oil passage 52, the output port oil passage 57, the input port 62c and output port 62e of the switch valve 60, and the clutch oil passage 54 correspond to a "third flow passage". Here, the "motor" is not limited to an internal combustion engine that outputs power in accordance with a hydrocarbon-based fuel such as gasoline or light oil, and another type of internal combustion engine, such as a hydrogen engine, may be used. Moreover, any type of motor capable of outputting power, such as an electric motor rather than an internal combustion engine, may be employed. The "power transmission apparatus" is not limited to an apparatus including the automatic speed change mechanism 30 having first to fourth forward shift speeds, and may be an apparatus including an automatic speed change mechanism having any number of shift speeds, such as three, five, or six shift speeds and so on. Moreover, the "power transmission apparatus" is not limited to an apparatus including an automatic speed change mechanism, and may be any constitution as long as power is transmitted from a motor via a frictional engagement element, such as the constitution in which the crankshaft 14 of the engine 12 is connected directly to the vehicle wheels 18a, 18b via a clutch. Note that the embodiment is an example illustrating specific example of the invention described in the Summary of the Invention, and therefore these correspondence relationships between the main elements of the embodiment and the main elements of the invention described in the Summary of the Invention are not intended to limit the elements of the invention described in the Summary of the Invention. In other words, the invention described in the Summary of the Invention is to be interpreted on the basis of the descriptions in that section, while the embodiment is merely a specific example of the invention described in the Summary of the Invention.

The embodiment of the present invention was described above, but the present invention is not limited in any way to the embodiment and may be implemented in various embodiments within a scope that does not depart from the spirit of the present invention.

The present invention may be used in the power transmission apparatus manufacturing industry and the automobile industry.

What is claimed is:

1. A pump apparatus comprising:
    a first pump for pumping working fluid in accordance with a reciprocation of a piston using a space between a first open/close valve for suction and a second open/close valve for discharge as a pump chamber;
    a first flow passage for supplying the working fluid from a supply source to an operation subject via the first open/close valve, the pump chamber, and the second open/close valve in accordance with an operation of the first pump;
    a second flow passage for supplying the working fluid pumped by a second pump, which is different from the first pump, to the pump chamber; and
    a selector for selecting either the first flow passage or the second flow passage.

2. The pump apparatus according to claim 1, wherein the selector selects the first flow passage when the first pump is operative and selects the second flow passage when the first pump is stopped.

3. The pump apparatus according to claim 1, wherein the second flow passage is a flow passage for supplying the working fluid pumped by the second pump to the pump chamber via the first open/close valve.

4. The pump apparatus according to claim 3, wherein the second flow passage is a circulation flow passage for draining the working fluid pumped by the second pump via the first open/close valve, the pump chamber, and the second open/close valve.

5. The pump apparatus according to claim 1, wherein
    the first pump is controlled to operate when the second pump is stopped and to stop when the second pump is operative, and
    the selector is a switch valve that is operated by fluid pressure from the second pump to open the first flow passage and block the second flow passage when fluid pressure is not applied thereto by the second pump and to block the first flow passage and open the second flow passage when fluid pressure is applied thereto by the second pump.

6. A power transmission apparatus that includes the pump apparatus according to claim 5 and transmits power from a motor via a frictional engagement element serving as the operation subject, comprising:
    a third flow passage for supplying working fluid pumped by the second pump to a fluid pressure servo of the frictional engagement element, wherein
    the first pump is a pump for pumping the working fluid upon reception of a power supply,
    the second pump is a pump for pumping the working fluid in accordance with power from the motor, and
    the switch valve is also a valve that opens the third flow passage when fluid pressure is applied thereto by the second pump and blocks the third flow passage when fluid pressure is not applied thereto by the second pump.

7. The power transmission apparatus according to claim 6, wherein the first pump is a solenoid valve including an electromagnetic unit for generating an electromagnetic force, which functions as an electromagnetic pump for pumping the working fluid when the piston is caused to reciprocate by the electromagnetic force of the electromagnetic unit, and also functions as a pressure regulating valve that has a pressure regulating chamber separate from the pump chamber and uses the electromagnetic force of the electromagnetic unit to regulate fluid pressure from the first pump and then output the regulated fluid pressure.

8. The power transmission apparatus according to claim 7, wherein
    the first pump includes: a piston defining a first fluid chamber used as the pump chamber and a second fluid chamber connected to the operation subject; an electromagnetic unit that uses the electromagnetic force to cause the piston to perform an outward motion; an elastic member that causes the piston to perform a return motion by applying an elastic force to the piston in an opposite direction to the electromagnetic force of the electromagnetic unit; the first open/close valve, which is attached in a direction for permitting the working fluid to move into the first fluid chamber; and the second open/close valve, which is provided in a flow passage connecting the first fluid chamber and the second fluid chamber and attached in a direction for permitting the working fluid to move from the first fluid chamber to the second fluid chamber, and
    the piston defines the first fluid chamber and the second fluid chamber such that during the outward motion, a volume of the first fluid chamber is reduced and a volume of the second fluid chamber is increased and during the return motion, the volume of the first fluid chamber is increased and the volume of the second fluid chamber is reduced, and the piston is formed such that a change of the volume of the first fluid chamber becomes greater than a change of the volume of the second fluid chamber when the piston reciprocates.

9. The power transmission apparatus according to claim 8, wherein the second flow passage is formed such that the working fluid circulates from the second pump via the first open/close valve, the first fluid chamber, the second open/close valve, and the second fluid chamber in sequence.

10. The power transmission apparatus according to claim 7, wherein the first open/close valve and the second open/close valve are built into the solenoid valve.

11. The power transmission apparatus according to claim 7, wherein the first open/close valve and the second open/close valve are built into the switch valve.

12. The power transmission apparatus according to claim 11, wherein
    in the switch valve, a space surrounded by the first open/close valve and the second open/close valve is connected to the solenoid valve and used as a part of the pump chamber,
    the switch valve includes: a hollow portion having a signal pressure input port for inputting fluid pressure from the second pump as a signal pressure, a suction port for inputting the working fluid into an inflow side of the first open/close valve, a discharge port for outputting the working fluid from an outflow side of the second open/close valve to the fluid pressure servo of the frictional engagement element, a discharge port for discharging the working fluid from the outflow side of the second open/close valve, a first input port connected to the supply source of the working fluid, a second input port for inputting the working fluid pumped by the second pump, a first output port connected to the suction port via a flow passage outside the switch valve, a third input port connected to a pressure regulating chamber of the solenoid valve, and a second output port connected to the fluid pressure servo of the frictional engagement element; a spool that slides within the hollow portion; and the first open/close valve and the second open/close valve, which are disposed in the hollow portion, and the spool operates such that when fluid pressure is input into the signal pressure input port, the working fluid pumped by the second pump circulates through the second input port, the first output port, the suction port and the discharge port in sequence while the working fluid from the pressure regulating chamber of the solenoid valve is supplied to the fluid pressure servo via the third input port and the second output port, and when fluid pressure is not input into the signal pressure input port, the working fluid from the supply source is supplied to the fluid pressure servo via the first input port, the first output port, the suction port, the first pump and the discharge port in sequence while the third input port and the second output port are blocked.

13. A vehicle comprising the power transmission apparatus according to claim 6 installed therein.

* * * * *